W. J. WARD.
BOOM.
APPLICATION FILED JULY 12, 1912.

1,179,583.

Patented Apr. 18, 1916.
3 SHEETS—SHEET 1.

WITNESSES:
Sudger A. Nicol.
Helen F. Loescher.

INVENTOR.
William J. Ward
BY
Gardner D. Rasson
ATTORNEY.

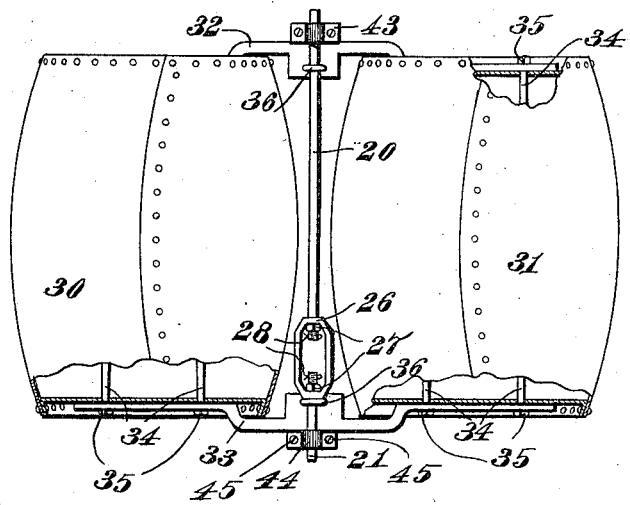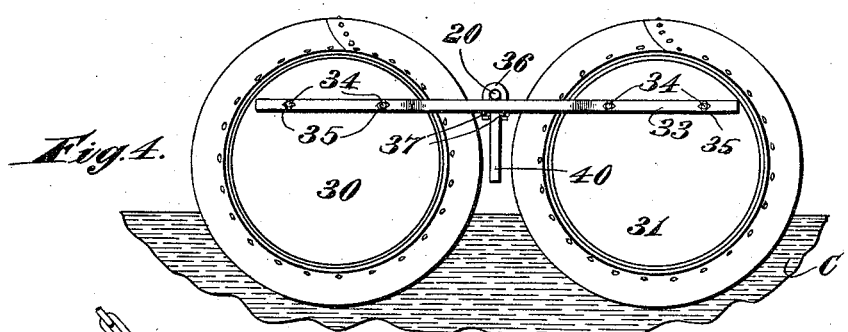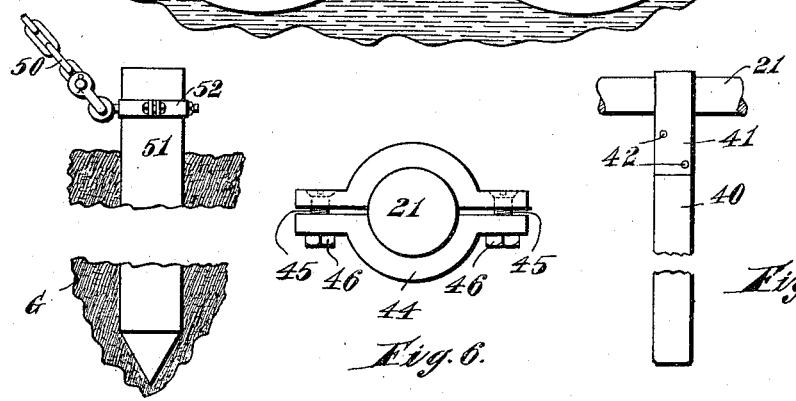

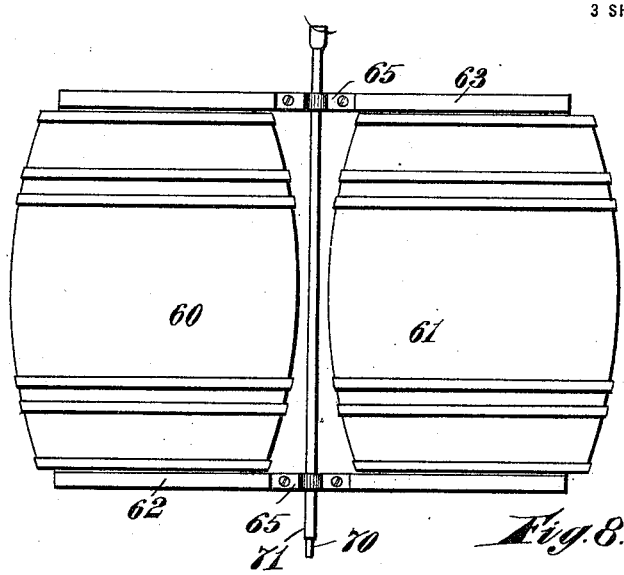
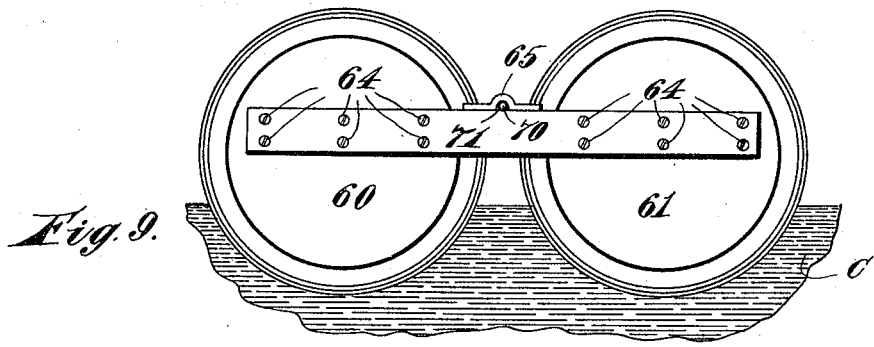
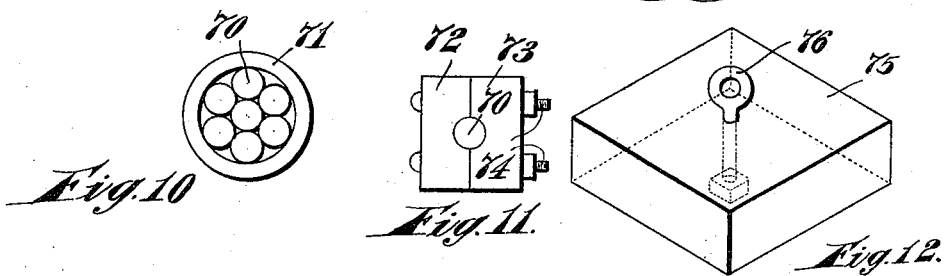

UNITED STATES PATENT OFFICE.

WILLIAM J. WARD, OF LAWRENCE, MASSACHUSETTS.

BOOM.

1,179,583.  Specification of Letters Patent.  Patented Apr. 18, 1916.

Application filed July 12, 1912.  Serial No. 709,059.

*To all whom it may concern:*

Be it known that I, WILLIAM J. WARD, a citizen of the United States, residing at Lawrence, in the county of Essex and State of Massachusetts, have invented certain new and useful Improvements in Booms, of which the following is a specification.

This invention relates to booms used in rivers, streams and in other bodies of water for the purpose of catching floating material of various kinds.

Its special purpose is to serve as a protection for boats above fall or rapids.

It consists essentially of a guard member held somewhat above the surface of the stream at a height sufficient to permit ordinary logs, drift wood and refuse to pass underneath but to stop any object such as a boat which projects some distance out of the water. If the boat is not sufficiently high to be stopped, my boom is preferably sufficiently buoyant so that passengers in the boat can climb out therefrom and remain upon the boom or its floats until they are rescued.

I prefer to attach to the guard member suitable pendants which reach down toward the water level and are capable of swinging so that if they are struck by any inanimate object, they will not stop that object. These are for use by a person who falls into the water and might not be able to reach the main guard member.

Figure 1:
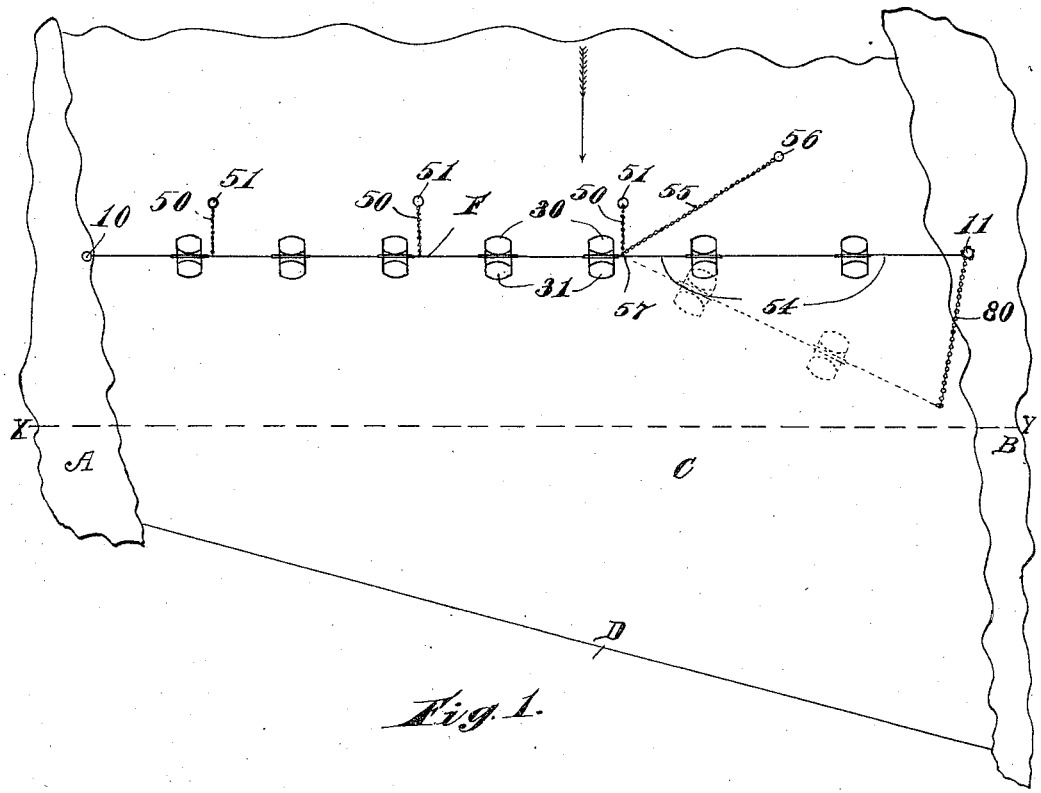
Figure 2:
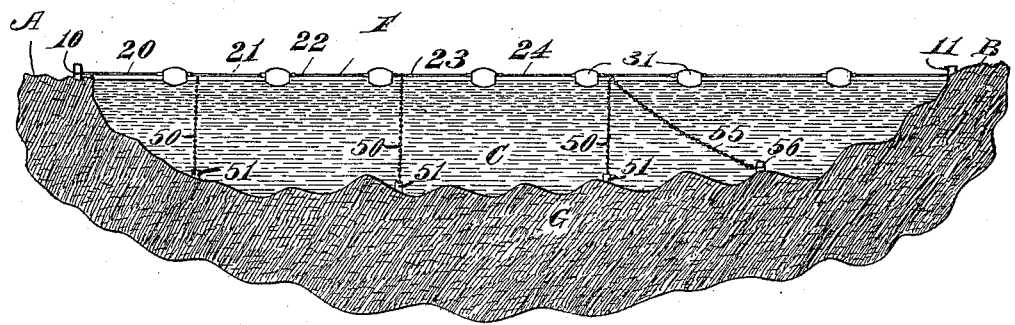

Figure 1 is a plan view of a river with my boom in place. Fig. 2 is a sectional elevation on the line X—Y of Fig. 1. Fig. 3 is a plan view of the preferred form of one of my floats and Fig. 4 is an elevation from one end thereof. Fig. 5 is an elevation of one of the cut off piles driven into the bed of the river by which my boom is anchored. Fig. 6 is an end view of one of the stops which holds the floats in place in the boom. Fig. 7 is a front view of one of the swinging pendants. Fig. 8 is a plan view of a modified form of float. Fig. 9 is an end view thereof. Fig. 10 is a section of another form of guard member which I may use. Fig. 11 is a section showing a wooden stiffener suitable for a cable guard member. Fig. 12 is a perspective view of an anchor stone which may be used in place of a pile. Fig. 13 shows a method of attaching and connecting sections where cables are used for the guard member.

A and B are the banks of the river the water of which represented by C travels in the direction shown by the arrow.

D is the dam.

F indicates the complete boom and G is the river bottom. The boom F extends across the river from bank A to bank B. The guard member of my device may be continuous from a suitable post or other fastener as 10 on bank A to a similar post or other fastener 11 on bank B, but I prefer to build it up in sections 20, 21, 22, 23, 24 which can be readily fastened together or unfastened. I prefer to use as supports for the guard member, twin floats suitably fastened together by parallel connecting arms. I prefer to use for such floats, the steel or metal barrels 30 and 31 of any well known construction securely fastened together at their ends by means of metal arms 32 and 33 which are preferably attached to the barrels by means of bolts 34 which extend entirely through each barrel and through both arms 32 and 33, being held in place by means of nuts 35. These arms may be attached at any desired point and as shown in Fig. 4 their position determines the height of the guard member from the water C and from the water line of the floats. I prefer to use for my guard member, the sections 20, 21, 22, 23, 24 of metal rods of suitable length. I also prefer to connect their ends as shown in Fig. 3 between the arms 32 and 33 of the twin float members. This I prefer to do by means of a link 26 through each end of which is a hole for the passage of an end of a rod 20 or 21. These ends are screw threaded and receive the nuts 27 and preferably are provided with holes to receive the split pins 28. In this manner by removing the split pins 28 and nuts 27 the rods may be readily removed from the floats. I prefer to pass these rods 20 and 21 through U clamps 36 the necks of which pass over the rod as shown in Fig. 4 and the legs of which pass through holes in an arm as 33 being held firmly in place by nuts 37. By this construction if it is desired to remove a single section of float, by removing nuts 37 and the U clamps 36, that particular float may be released from the rod and removed entirely.

To prevent the floats from sliding back on the guard member thereby getting out of place I provide stops which comprise two members 43 and 44 which are shaped to fit the rod as 21 and are attached together by means of bolts 45 and nuts 46 as shown in Fig. 6. These are clamped into position just outside of arms 32 and 33 thus holding the floats in place and preventing them from sliding along the guard member.

To provide means whereby a person floating in the water may be supported in case he cannot reach the guard member, I prefer to use a series of pendants 40 preferably of wood connected to each rod section 21 by means of a metal strap 41 which passes over the rod and is fastened to the outside of the member 40 by means of nails 42 or screws. These pendants may be as near together as deemed advisable. Preferably, they should be close enough so that any person in the water can readily reach either one or another.

It is manifest that if the boom were not anchored, the pressure of the current would tend to force it down stream out of true and might eventually break it. I therefore provide a series of anchor chains 50 attached at convenient points to the guard member or to the floats and extending up stream as shown especially in Fig. 1. To hold the boom in place, I prefer to drive piles 51 into the bed of the river G and to attach thereto by means of a collar 52 or otherwise an anchor chain 50. These anchor chains 50 should be of sufficient length so that the lifting action of the floats will have little or no effect upon them. I find it convenient for such boom, either at one end or the other, to have a section which may serve as a gate as shown at 54. In such case, I find it desirable to use an additional anchor chain 55 extended diagonally to a pile as 56 so as to hold the boom in place when gate 54 is opened. This gate 54 may comprise one or more sections of the guard member and one or more floats, but must be connected with the last guard member of the boom by a suitable pivot joint at 57 whereby it may swing as shown by the dotted lines in Fig. 1. This gate section is so attached to post 11 on the bank that it can be readily unfastened therefrom to permit it to float down the stream swinging as shown in Fig. 1 by the dotted lines. Any boat or other floating article can be allowed to pass and then the gate can be closed. The gate can be closed by going out in a boat and taking it back to position or preferably by attaching a light line or chain as 80 to the swinging end and allowing it to pay out and drop to the bottom until the passage is made when the gate section is hauled back and again attached to post 11.

Instead of the steel barrels 30 and 31, I may use wooden barrels as 60 and 61 attached together by means of joists 62 and 63 through the medium of screws 64 and provided with clamps 65 through which the guard member passes. This guard member may be an iron cable 70 preferably inclosed in a metal pipe 71 see Fig. 10 or incased in two wooden sections 72 and 73 see Fig. 11 held together by bolts 74. The object of the pipe or wooden sections is to stiffen the cable and prevent it from sagging into the water from the floats. The piles 51 may be replaced by anchor stones 75 each provided with a suitable eye bolt 76. The cable 70 may be continuous or it may be made in sections as 77, 78 held together by loops formed by clamps of a well known type 79. The anchor chain or cable 50 may be attached to one of these loops as shown in Fig. 13.

I prefer to construct my boom in sections and of rods in the manner first described as it can be more easily taken apart and put together, but I may use a continuous cable if desired. I prefer to attach the anchor chains just beyond the floats and close thereto to facilitate the locating of the floats when putting the boom in place. It is also a fact that logs or other floating articles which float low in the water but have considerable weight will gradually force themselves under the barrels lifting them and thus pass the boom while lighter articles will be stopped.

What I claim as my invention and desire to cover by Letters Patent, is:

1. In a boom for streams, the combination of a plurality of sections detachably attached together and extending from bank to bank each section comprising two barrels fastened together at their ends by means of arms and a section of metal rod supported by said arms so that it runs lengthwise over and between and extends beyond the barrels.

2. In a boom for streams, the combination of two metal barrels, metal arms which attach the barrels together at their ends, a metal rod which rests upon the arms and clamps which fasten the rod to the arms so that it runs lengthwise over and between and extends beyond the barrels.

3. In a boom for streams, the combination of a guard member which extends from bank to bank, with floats each of which comprises two barrels fastened together at their ends by means of arms, fastening devices which attach the guard member to the arms, so that it runs lengthwise over and between and extends beyond the barrels, piles in the bed of the stream, and anchor chains between the piles and the guard member as described.

4. In a boom for streams, the combination of a plurality of sections detachably attached together forming a guard member which extends from bank to bank, with floats each of which comprises two barrels fastened together and to the sections of the guard member in such manner that the guard member will be held above the water line of the barrels, piles driven into the bed of the stream, and anchor chains between the piles and the guard member as described.

5. In a boom for streams, the combination of a plurality of floats each of which consists of two barrels fastened together at their ends by means of arms, with a guard member which extends from bank to bank and is supported above the water line by the floats one end being detachably attached to the bank and pivotally connected with the main part of the guard member, piles in the bed of the stream, and anchor chains which extend from the piles to the main part of the guard member as described.

6. In a boom for streams, the combination of a plurality of floats each of which consists of two barrels fastened together at their ends by means of arms, with a guard member which extends from bank to bank and consists of a plurality of sections detachably attached together and supported by said arms above the water line, piles in the bed of the stream, and anchor chains which extend from the piles to the main part of the guard member as described.

7. In a boom for streams, the combination of a guard member which extends from bank to bank and is formed of sections detachably attached one to the other, and a plurality of floats each of which consists of two barrels fastened together at their ends by means of arms, with said arms which are attached to the guard member and to the barrels in such manner that the guard member extends lengthwise between the barrels and is supported above the water line thereby.

8. In a boom for streams, the combination of a guard member which extends from bank to bank and is formed of sections detachably attached one to the other, with a plurality of floats each of which consists of two barrels fastened together at their ends by means of arms, said arms which are attached to the guard member and to the barrels in such manner that the guard member extends lengthwise between the barrels and is supported above the water line thereby, piles in the bed of the stream, and anchor chains which extend from the piles to the main part of the guard member as described.

9. In a boom for streams, the combination of a guard member which extends from bank to bank, and a plurality of floats each of which consists of two barrels fastened together at their ends by means of arms, with said arms which are attached to the guard member and to the barrels in such manner that the guard member extends lengthwise between the barrels and is supported above the water line thereby, together with a plurality of pendants which depend from the guard member as described.

10. In a boom for streams, the combination of a guard member which extends from bank to bank and is formed of sections detachably attached one to the other, with a plurality of floats each of which consists of two barrels fastened together at their ends by means of arms, said arms which are attached to the guard member and to the barrels in such manner that the guard members extends lengthwise between the barrels and is supported above the water line thereby, piles in the bed of the stream, and anchor chains which extend from the piles to the main part of the guard member, together with a plurality of pendants which depend from the guard member as described.

In testimony whereof, I hereto affix my signature in presence of two witnesses.

WILLIAM J. WARD.

Witnesses:
  GARDNER W. PEARSON,
  JAMES A. DOWD.

Copies of this patent may be obtained for five cents each, by addressing the "Commissioner of Patents, Washington, D. C."